(12) United States Patent
Wang

(10) Patent No.: US 9,238,300 B2
(45) Date of Patent: Jan. 19, 2016

(54) CONTAINER FOR STORING MULTIPLE SAW BLADES

(71) Applicant: Eupin Wang, New Taipei (TW)

(72) Inventor: Eupin Wang, New Taipei (TW)

( * ) Notice: Subject to any disclaimer, the term of this patent is extended or adjusted under 35 U.S.C. 154(b) by 68 days.

(21) Appl. No.: 14/201,878

(22) Filed: Mar. 9, 2014

(65) Prior Publication Data

US 2015/0251307 A1  Sep. 10, 2015

(51) Int. Cl.
| | |
|---|---|
| *B25H 3/00* | (2006.01) |
| *B25H 3/02* | (2006.01) |
| *B65D 25/10* | (2006.01) |
| *B65D 43/14* | (2006.01) |
| *B65D 43/22* | (2006.01) |
| *B65D 25/54* | (2006.01) |
| *B23Q 13/00* | (2006.01) |

(52) U.S. Cl.
CPC ............ *B25H 3/003* (2013.01); *B65D 25/108* (2013.01); *B65D 25/54* (2013.01); *B65D 43/14* (2013.01); *B65D 43/22* (2013.01); *B23Q 13/00* (2013.01)

(58) Field of Classification Search
CPC ........ B23Q 13/00; B23D 50/00; B23D 59/00; B23D 61/02; B23D 61/025; B65D 2583/0431; B65D 2583/0436; B65D 2583/044; B65D 85/02; B65D 85/58; B65D 43/14; B65D 43/22; B65D 25/54; G11B 33/045; G11B 33/0433; G11B 33/0427; B25H 3/006; B25H 3/06; B25H 3/02; B25H 3/003; B27B 5/29; Y10S 206/806
USPC ....................................................... 720/728
See application file for complete search history.

(56) References Cited

U.S. PATENT DOCUMENTS

| | | | | | |
|---|---|---|---|---|---|
| 2,459,460 | A | * | 1/1949 | Segal ............................ | 206/349 |
| 2,950,004 | A | * | 8/1960 | Acomb ......................... | 206/349 |
| 3,053,424 | A | * | 9/1962 | Reinhard ...................... | 294/163 |
| 3,259,231 | A | * | 7/1966 | Romanowski et al. ....... | 206/349 |
| D271,918 | S | * | 12/1983 | Ramirez ........................ | D3/282 |
| 4,811,998 | A | * | 3/1989 | Rankin .................. | B25H 3/006 |
| | | | | | 206/303 |
| 4,896,771 | A | * | 1/1990 | Edwards ....................... | 206/349 |
| 4,921,153 | A | * | 5/1990 | Smith ........................... | 224/683 |
| D310,912 | S | * | 10/1990 | Dennis ........................... | D3/315 |
| 5,078,266 | A | * | 1/1992 | Rackley ........................ | 206/349 |
| D338,337 | S | * | 8/1993 | Roe, Jr. ......................... | D3/315 |
| 5,611,426 | A | * | 3/1997 | Warfield .................... | 206/308.1 |
| 5,743,390 | A | * | 4/1998 | Pozzoli ......................... | 206/232 |
| 5,782,348 | A | * | 7/1998 | Burdett .................... | 206/308.1 |
| D397,934 | S | * | 9/1998 | Giulianelli ................... | D9/415 |
| 6,161,689 | A | * | 12/2000 | Reithel ......................... | 206/303 |
| 6,164,447 | A | * | 12/2000 | Svetlik ......................... | 206/373 |
| D441,955 | S | * | 5/2001 | Svetlik ........................... | D3/282 |
| 6,230,887 | B1 | * | 5/2001 | Snider .......................... | 206/349 |

(Continued)

*Primary Examiner* — Mickey Yu
*Assistant Examiner* — Gideon Weinerth
(74) *Attorney, Agent, or Firm* — Patent Office of Bang Shia

(57) ABSTRACT

A container for storing multiple saw blades includes: a base, a cover and a plurality of positioning units. The cover has one side pivotally fixed to the base, another side clasped to the base by a clasp, and a covering portion between the two sides of the cover. The covering portion is smaller than the base. The positioning units each include a stop piece and a central positioning block which are disposed on the base in a spaced manner. The stop pieces are located at different distances from the peripheral wall and have different heights with respect to the bottom of the base, the heights of the saw blades are proportional to the distances of the stop pieces to the peripheral wall of the base, and the central positioning blocks are disposed on the covering portion or the base.

10 Claims, 9 Drawing Sheets

(56) References Cited

U.S. PATENT DOCUMENTS

| | | | |
|---|---|---|---|
| 6,405,859 B1 * | 6/2002 | Ku | 206/308.1 |
| 6,427,832 B1 * | 8/2002 | Ali et al. | 206/303 |
| D466,692 S * | 12/2002 | Hargrave-Thomas | D3/315 |
| 6,729,468 B1 * | 5/2004 | Dobmeier | 206/303 |
| 6,932,215 B1 * | 8/2005 | Chang | 206/308.1 |
| 7,066,327 B2 * | 6/2006 | Baublitz et al. | 206/349 |
| 7,108,129 B2 * | 9/2006 | Corley et al. | 206/308.1 |
| 7,172,068 B1 * | 2/2007 | Griffin et al. | 206/349 |
| 7,178,214 B1 * | 2/2007 | Wilson | 29/281.1 |
| 7,191,898 B1 * | 3/2007 | Williams | 206/303 |
| D566,450 S * | 4/2008 | Meding et al. | D6/635 |
| D618,997 S * | 7/2010 | Roesler | D9/415 |
| D621,155 S * | 8/2010 | Francesconi | D3/315 |
| 7,766,160 B2 * | 8/2010 | Pozzoli | 206/307 |
| 8,944,246 B2 * | 2/2015 | Kim et al. | 206/438 |
| 2002/0029986 A1 * | 3/2002 | Shiga | 206/303 |
| 2003/0029748 A1 * | 2/2003 | Hargrave-Thomas | 206/303 |
| 2003/0126839 A1 * | 7/2003 | Hoogland | 53/473 |
| 2003/0205491 A1 * | 11/2003 | Huang | 206/310 |
| 2004/0020806 A1 * | 2/2004 | German, III | 206/349 |
| 2005/0092628 A1 * | 5/2005 | Chang | 206/308.1 |
| 2005/0133389 A1 * | 6/2005 | Baublitz et al. | 206/303 |
| 2005/0133391 A1 * | 6/2005 | Chen | 206/308.1 |
| 2006/0186004 A1 * | 8/2006 | Smith | 206/349 |
| 2008/0078684 A1 * | 4/2008 | Lin | 206/372 |
| 2008/0190793 A1 * | 8/2008 | Pozzoli | 206/308.1 |
| 2008/0196052 A1 * | 8/2008 | Pozzoli | 720/728 |
| 2008/0251398 A1 * | 10/2008 | Giraud | 206/308.1 |
| 2009/0261005 A1 * | 10/2009 | Kasubowski et al. | 206/349 |
| 2010/0072093 A1 * | 3/2010 | Cross | 206/349 |
| 2010/0258460 A1 * | 10/2010 | Gelardi et al. | 206/308.1 |
| 2011/0031141 A1 * | 2/2011 | Lau | 206/308.1 |

* cited by examiner

CONTAINER FOR STORING MULTIPLE SAW BLADES

BACKGROUND OF THE INVENTION

1. Field of the Invention

The present invention relates to a container, and more particularly to a container for storing multiple saw blades.

2. Description of the Prior Art

Saw blades are normally held in an ordinary tool box, and an ordinary tool box is not provided with any structure to hold the saw blades, therefore, saw blades cannot be positioned firmly in an ordinary tool box. In addition to the fact that the user is likely to get cut when reaching for the saw blades in the box, the saw blades are also likely to get damaged by randomly hitting against the tool box during transpiration, since they are not firmly fixed. Therefore, a saw blade container which is only capable of holding a single saw blade is developed, however, the storage capacity of this saw blade container is too small.

The present invention has arisen to mitigate and/or obviate the afore-described disadvantages.

SUMMARY OF THE INVENTION

The primary objective of the present invention is to provide a container for storing multiple saw blades.

To achieve the above objective, a container for storing multiple saw blades in accordance with the present invention comprises: a base, a cover and a plurality of positioning units.

The base includes a bottom and a peripheral wall around the bottom to define a space.

The cover includes one side pivotally fixed to the base, another side clasped to the base by a clasp, and a covering portion between the two sides of the cover. The covering portion is smaller than the base, and a surface of the covering portion toward the base is defined as an inner surface.

The positioning units each include a stop piece and a central positioning block which are disposed on the base in a spaced manner. The stop pieces are located at different distances from the peripheral wall and have different heights with respect to the bottom of the base, the heights of the saw blades are proportional to the distances of the stop pieces to the peripheral wall of the base, and the central positioning blocks are disposed on the covering portion or the base.

With the plurality of positioning units, and the spaced stop pieces and the secondary stop pieces, the container of the present invention is capable of holding a plurality of saw blades of the same of different sizes. The saw blades can be firmly positioned by the stop pieces, the secondary stop pieces and the central positioning blocks, without undesired movement. Besides, the saw blades are partially superimposed in the base, the covering portion is smaller than the base, plus the hollow portions, all these arrangements allow the saw blades to be visible when stored in the container, in other words, the container can also be used as an exhibition apparatus. Furthermore, the positioning clasp can be easily pivoted to clasp on the cover to make sure the cover is closed firmly with respect to the base, which makes the container easy to use. After the clasp is clasped onto the cover, the container can be hung from an object by the hanging aperture of the hanging portion of the clasp.

DETAILED DESCRIPTION OF THE PREFERRED EMBODIMENTS

Figure 1:
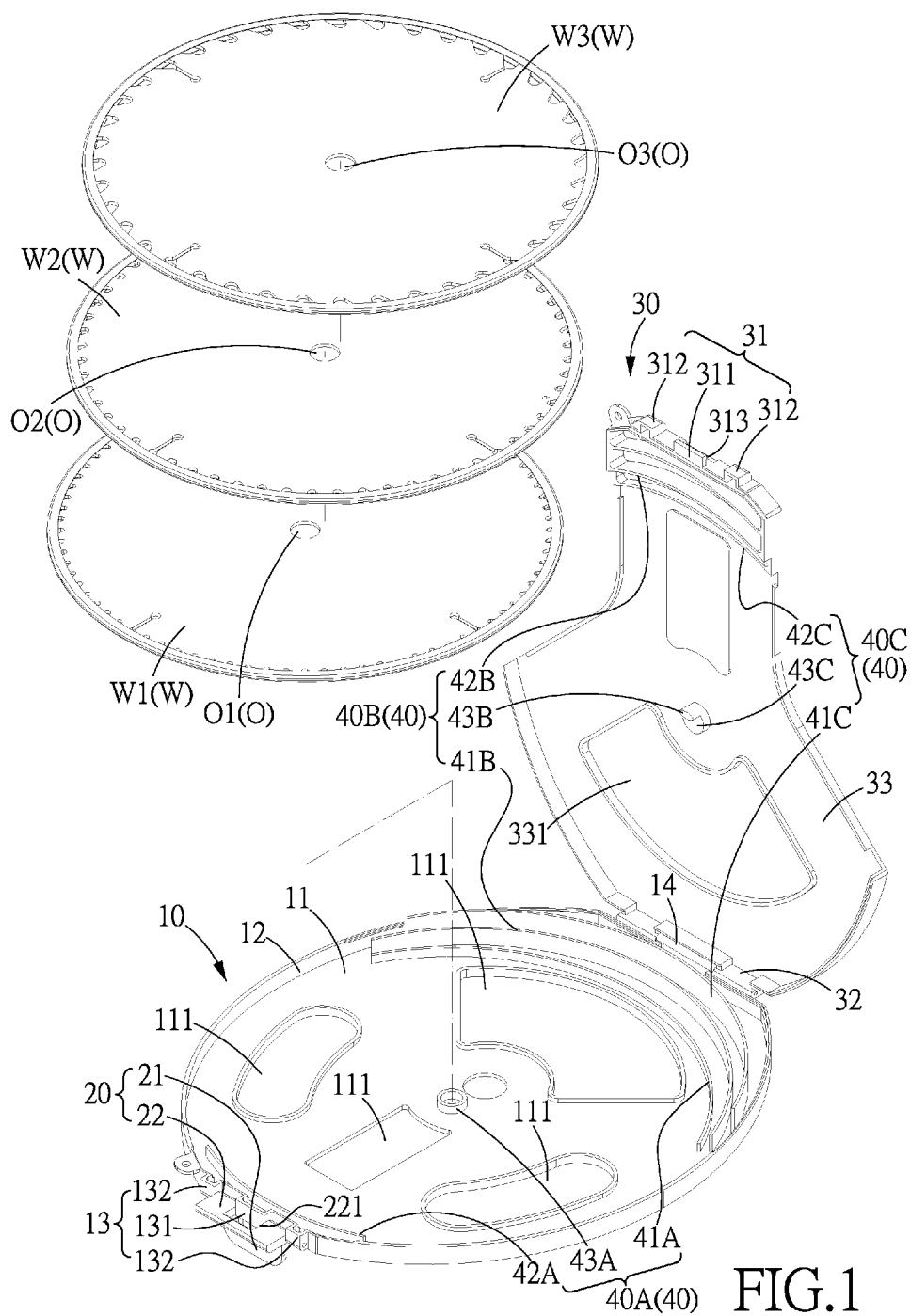
FIG. 1 is an exploded view of a container for storing multiple saw blades in accordance with the present invention.
Figure 2:
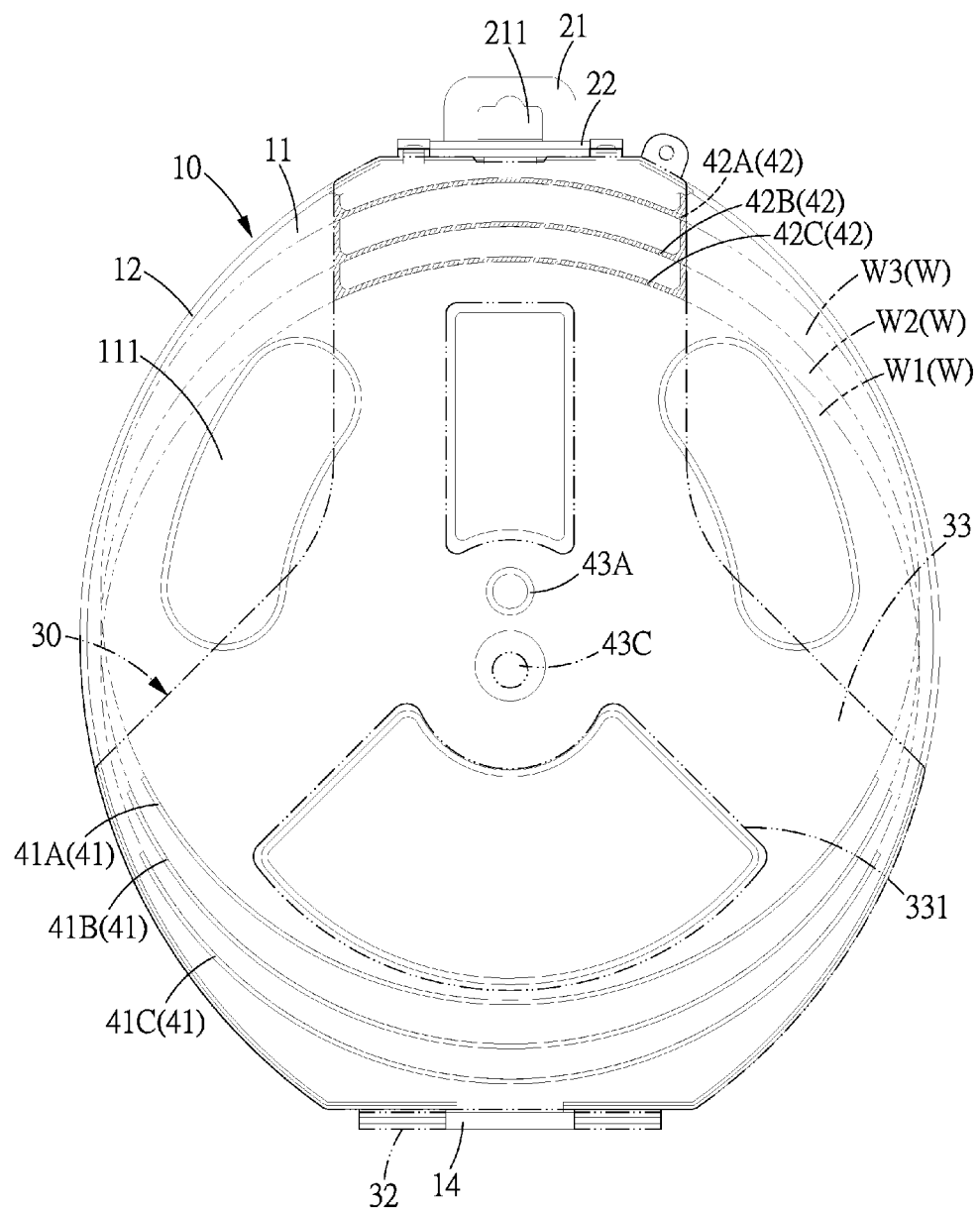
FIG. 2 is an assembly view of the container for storing multiple saw blades in accordance with the present invention.
Figure 3:
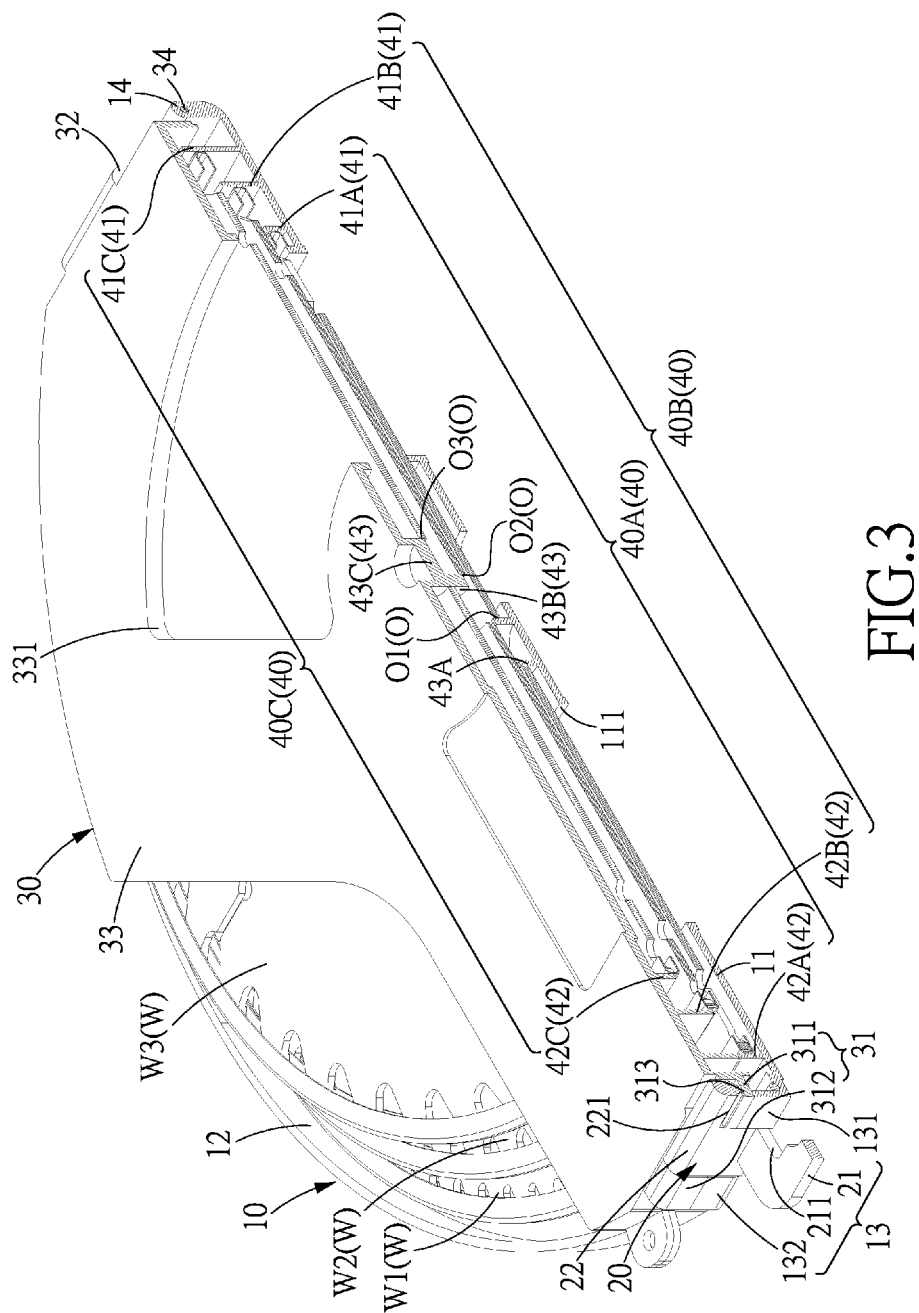
FIG. 3 is a cross sectional view of the container for storing multiple saw blades in accordance with the present invention.
Figure 4:
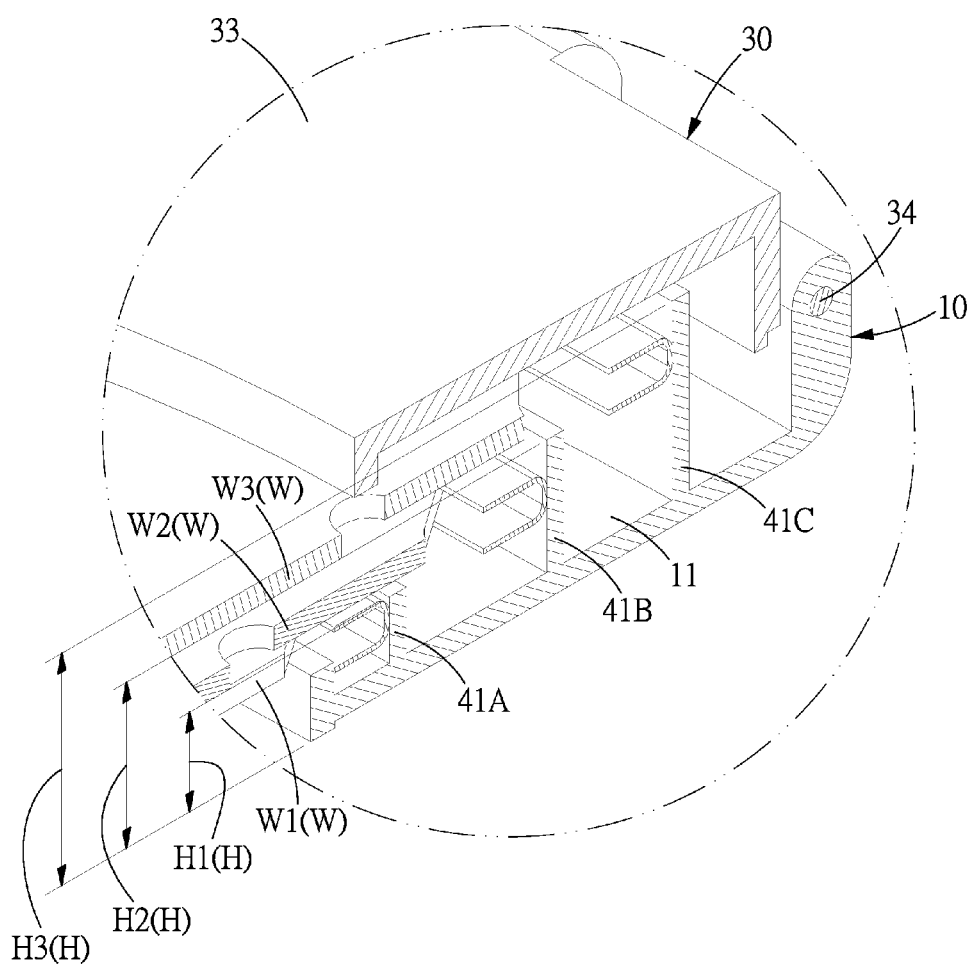
FIG. 4 is an enlarged view of FIG. 3.
Figure 5:
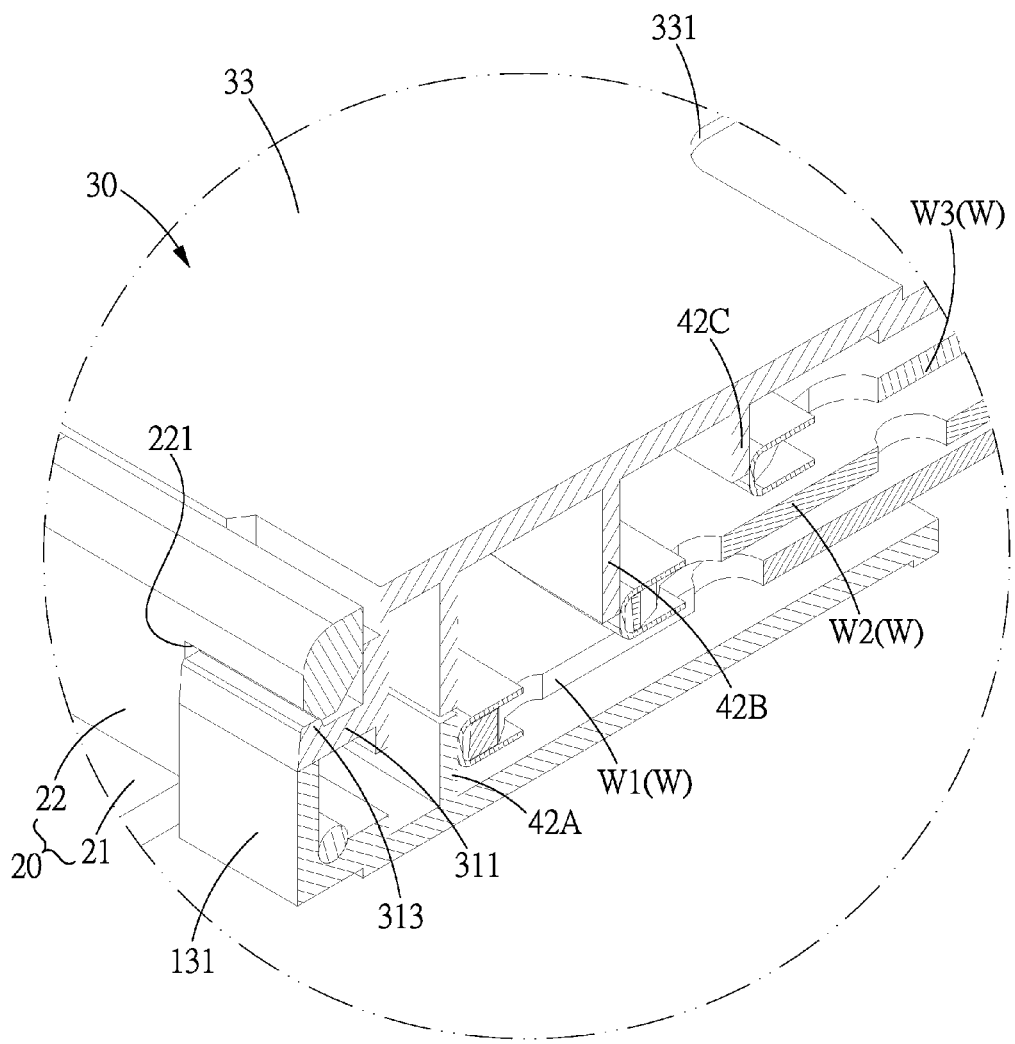
FIG. 5 is another enlarged view of FIG. 3.
Figure 7:
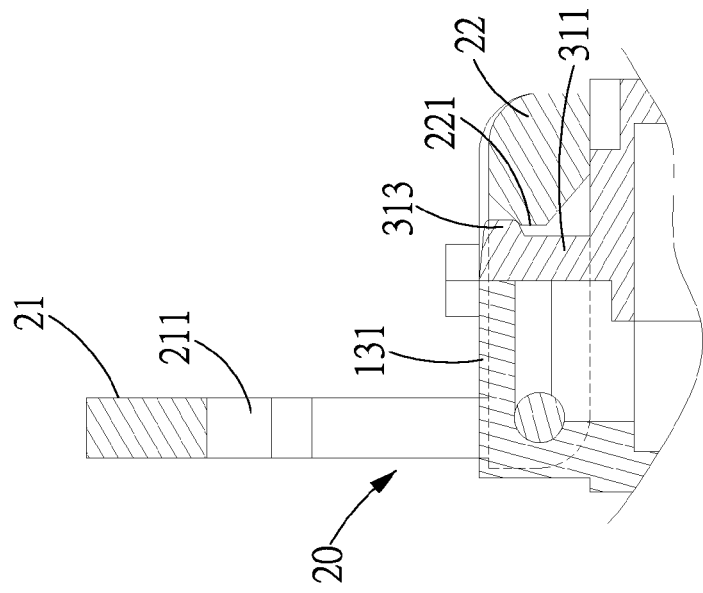
FIG. 7 is a cross sectional view showing that the clasp is clasped on the cover.
Figure 6:
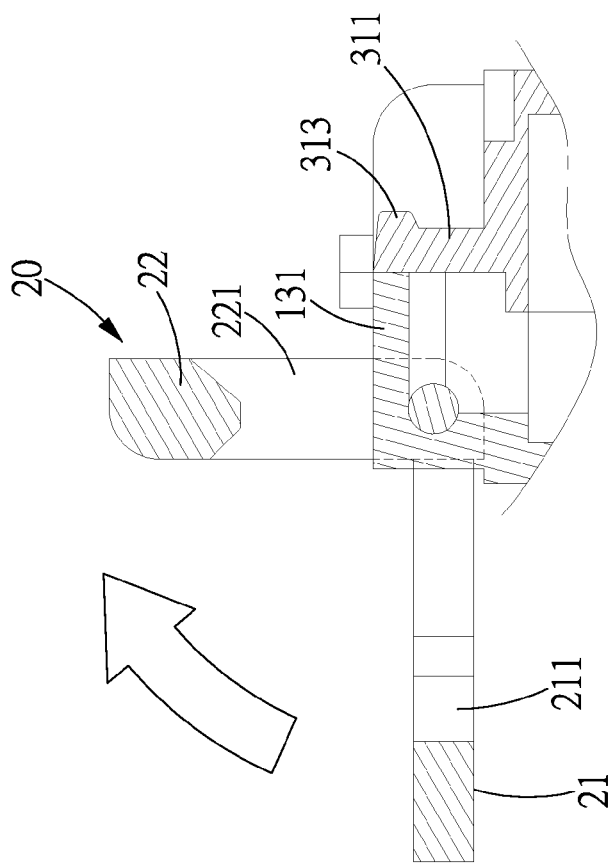
FIG. 6 is a cross sectional view showing that the clasp is disengaged from the cover.

The present invention will be clearer from the following description when viewed together with the accompanying drawings, which show, for purpose of illustrations only, the preferred embodiment in accordance with the present invention.

Referring to FIGS. 1-7, a container for storing multiple saw blades in accordance with a preferred embodiment of the present invention comprises: a base 10, a clasp, a cover 30, and a plurality of positioning units 40.

The base 10 includes a bottom 11 and a peripheral wall 12 around the bottom 11 to define a space for holding a plurality of saw blades W, and each of the saw blades W is formed with a central hole O. In the bottom 11 is formed a plurality of hollow portions 111 which penetrate the bottom 11. On one side of an outer surface of the peripheral wall 12 is formed a connecting portion 13 which consists of a mounting seat 131 and two ears 132 at two sides of the mounting seat 131, and on an opposite side of the outer surface of the peripheral wall 12 is formed a pivot portion 14.

The clasp 20 includes a hanging portion 21 and an engaging portion 22 to define an L-shaped structure. The hanging portion 21 is formed with a hanging aperture 211, and the engaging portion 22 is formed with an engaging aperture 221. The clasp 20 has the engaging aperture 221 engaged with the mounting seat 131 of the connecting portion 13, and has the engaging portion 22 pivotally disposed between the mounting seat 131 and the two ears 132, so that the clasp 20 is able to pivot with respect to the connecting portion 13.

The cover 30 is made of transparent plastic material, and provided with an assistant connecting portion 31 at one side, an assistant pivot portion 32 at another side thereof, and a covering portion 33 between the assistant connecting portion 31 and the assistant pivot portion 32. The assistant pivot portion 32 is pivotally fixed to the pivot portion 14 of the base 10 by a pivot 34, so that the cover 30 is able to open and close with respect to the base 10. The assistant connecting portion 31 includes an assistant mounting seat 311 and two ears 312 at two sides of the assistant mounting seat 311. The assistant mounting seat 311 includes an L-shaped hook portion 313. When the cover 30 is closed with respect to (covers) the base 10, the two ears 312 of the cover 30 are abutted against and aligned to the ears 132 of the base 10, and the assistant mounting seat 311 is abutted against the mounting seat 131. The covering portion 33 is smaller than the base 10 and formed with a plurality of hollow portions 331. When the cover 30 is closed with respect to the base 10, the hollow portions 331 of the covering portion 33 are aligned to the hollow portions 111 of the bottom 11 of the base 10, and the surface of the covering portion 33 toward the base 10 is defined as an inner surface. The covering portion 33 in this embodiment is mushroom-shaped, so that when the cover 30 covers the base 10, a part of the base 10 can be exposed (visible), and the saw blades are partially exposed when hold in the base 10.

Each of the positioning units 40 includes a stop piece 41, a secondary stop piece 42 and a central positioning block 43. The stop pieces 41 are disposed on the base 10 to restrict the saw blades W, in a manner that the peripheral edges of the saw blades W are stopped against the stop pieces 41. The secondary stop pieces 42 are all disposed on the covering portion 33, or one of the secondary stop pieces 42 is disposed on the base 10, and the rest secondary stop pieces 42 are disposed on the covering portion 33. The central positioning blocks 43 are disposed on the base 10 or on the covering portion 33 to insert in the central holes O of the saw blades W. When the covering portion 33 of the cover 30 is closed, the maximum distance between the stop piece 41 and the secondary stop piece 42 of each of the positioning unit 40 is the diameter of the saw blades W that can be held or stored, the central positioning block 43 is located between the stop piece 41 and the secondary stoppiece 42, and the positioning units 40 can have the same or different maximum distances between the stop pieces 41 and the secondary stop pieces 42.

The embodiment as shown in FIGS. 1-7 is provided with three positioning units 40 that have the same or different maximum distances between the stop pieces 41 and the secondary stop pieces 42. The three positioning units 40 include a first positioning unit 40A, a second positioning unit 40B, and a third positioning unit 40C. The first positioning unit 40A includes a first stop piece 41A, a first secondary stop piece 42A and a first central positioning block 43A, the second positioning unit 40B includes a second stop piece 41B, a second secondary stop piece 42B and a second central positioning block 43B, and the third positioning unit 40C includes a third stop piece 41C, a third secondary stop piece 42C and a third central positioning block 43C. The first central positioning block 43A is a cylindrical member disposed on the bottom 11 of the base 10. The first, second and third stop pieces 41A, 41B and 41C are disposed on the bottom 11 of the base 10 in a spaced manner and located at the same side of the first central positioning block 43A. The first, second and third stop pieces 41A, 41B and 41C are located at different distances from the peripheral wall 12 of the base 10, and have different heights with respect to the bottom 11 of the base 10, which are a first height H1 of the first stop piece 41A, a second height H2 of the second stop piece 41B, and a third height H3 of the third stop piece 41C, and the heights H1, H2, H3 are proportional to the distances of the first, second and third stop pieces 41A, 41B, 41C to the peripheral wall 12 of the base 10. Namely, the larger the distance of the stop piece to the peripheral wall 12, the larger the height H of the stop piece. The first secondary stop piece 42A is also disposed on the bottom 11 of the base 10, the second and third secondary stop pieces 42B, 42C are disposed on the inner surface of the covering portion 33 of the cover 30, and the second and third central positioning blocks 43B, 43C are disposed on the inner surface of the covering portion 33 of the cover 30 in a superimposed manner.

The container as shown in FIGS. 1-7 is capable of holding three saw blades W which disposed between the stop piece 41 and the secondary stop piece 42 of the respective positioning units 40. The saw blades W include a first saw blade W1, a second saw blade W2, and a third saw blade W3. Since the stop pieces 41 are located at different distances from the peripheral wall 12 of the base 10, the saw blades W will be partially superimposed, when held between the stop piece 41 and the secondary stop piece 42 of the respective positioning units 40. More specifically, when loading the saw blades, the first saw blade W1 is firstly placed between the stop piece 41A and the first secondary stop piece 42A of the first positioning units 40A, the first central positioning block 43A is inserted in the central hole O1 of the first saw blade W1, then the second saw blade W2 is partially superimposed on the first saw blade W1 and has the peripheral edge abutted against the second stop piece 41B, and then the third saw blade W3 is partially superimposed on the second saw blade W2 and has the peripheral edge abutted against the third stop piece 41C. The cover 30 is closed, after all the three saw blades are placed in the base 10, so that the second and third secondary stop pieces 42B, 42C disposed on the cover 30 are stopped against the peripheral edge of the second and third saw blades W2, W3, and the second and third central positioning blocks 43B, 43C are inserted in the central holes O2, O3 of the second and third saw blades W2, W3, respectively, so as to prevent undesired movement of the saw blades W. Finally, it only needs to turn the clasp 20 to make the engaging aperture 221 of the clasp 20 engage with the hook portion 313 of the assistant mounting seat 311, so that the clasp 20 is clasped onto the assistant mounting seat 311 to make sure the cover 30 is closed with respect to the base 10. It is to be noted that just the stop pieces 41 and the central positioning blocks 43 are also enough to fix the saw blades W, even without the secondary stop pieces 42.

Figure 8:
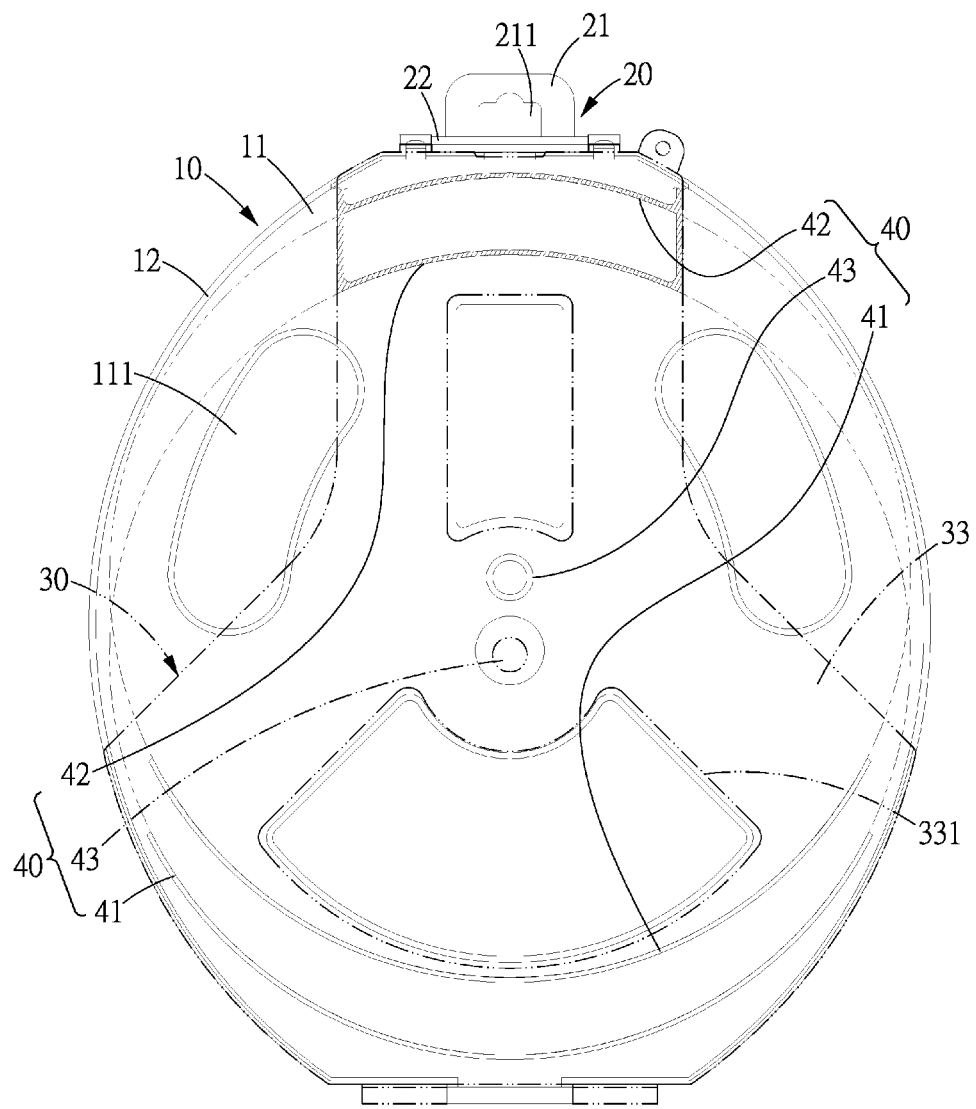
FIG. 8 shows a container for storing multiple saw blades in accordance with another embodiment of the present invention, wherein the container is provided with two positioning unit.

The previous embodiments discloses a container which is provided with three positioning units 40 that have the same distances between the stop pieces 41 and the secondary stop pieces 42, and are used to hold three saw blades of the same size. Of course, the container of the present invention can also be provided with two positioning units 40 and used to hold two saw blades W, as shown in FIG. 8.

Figure 9:
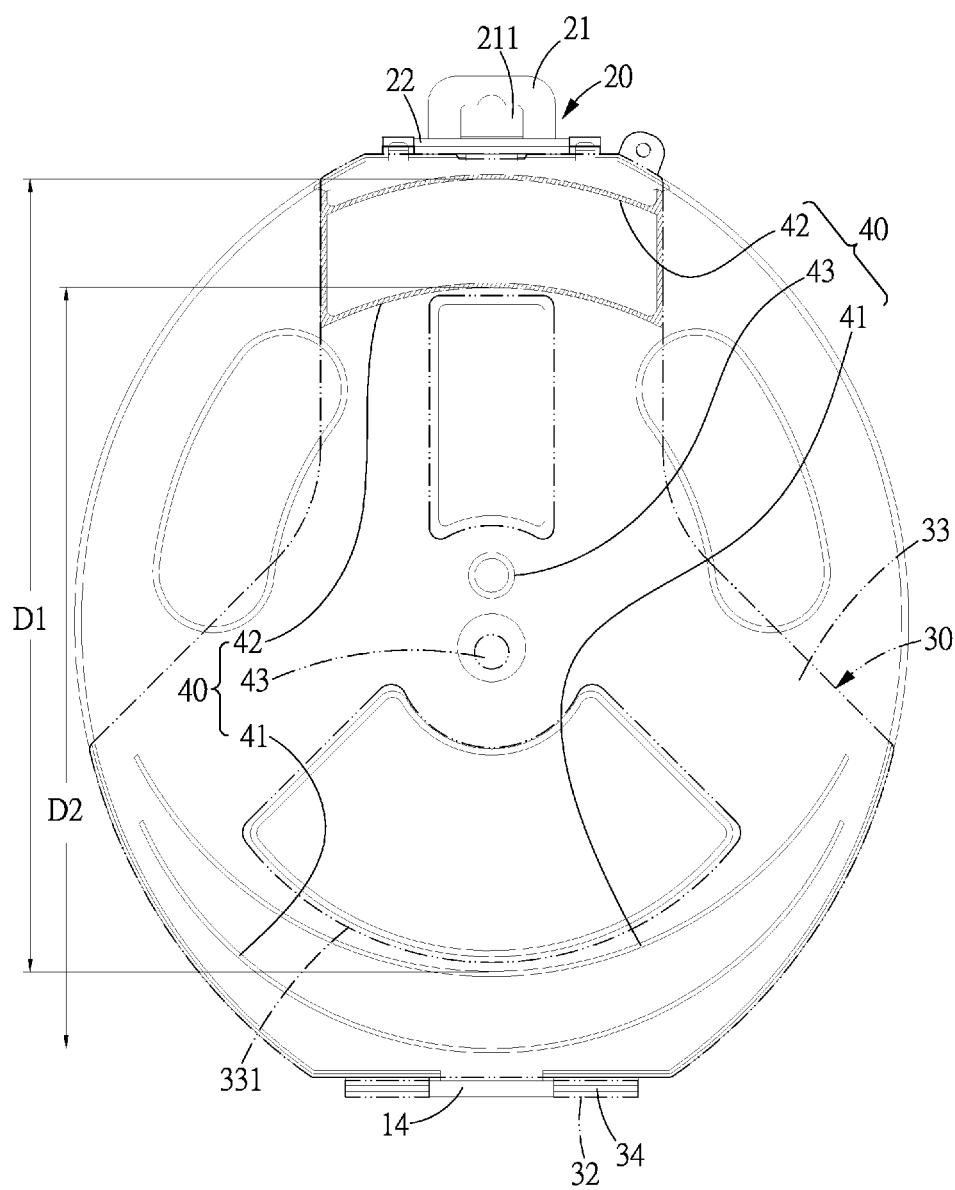
FIG. 9 shows a container for storing multiple saw blades in accordance with another embodiment of the present invention, wherein the container is capable of holding different sized saw blades.
Figure 10:
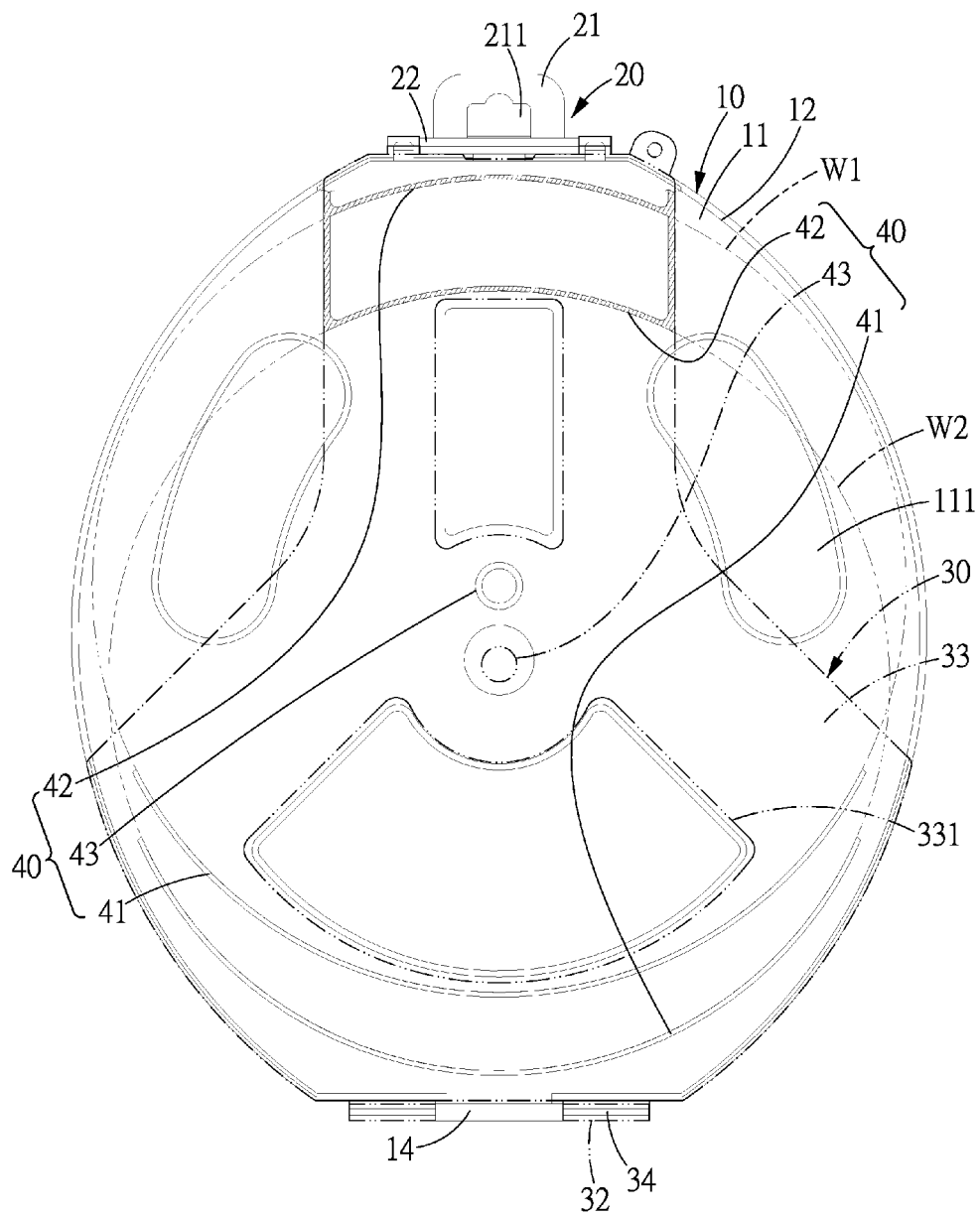
FIG. 10 is another view showing a container for storing multiple saw blades in accordance with another embodiment of the present invention, wherein the container is capable of holding different sized saw blades.

Referring then to FIGS. 9 and 10, the container is provided with two positioning units, wherein the distance between the stop piece 41 and the secondary stop piece 42 of one positioning unit is different from that of another positioning unit, so that the container is used to hold two saw blades W1 and W2 of two different sizes D1, D2.

With the plurality of positioning units, and the spaced stop pieces 41 and the secondary stop pieces 42, the container of the present invention is capable of holding a plurality of saw blades W of the same of different sizes. The saw blades W can be firmly positioned by the stop pieces 41, the secondary stop pieces 42 and the central positioning blocks 43, without undesired movement. Besides, the saw blades W are partially superimposed in the base 10, the covering portion 33 is smaller than the base 10, plus the hollow portions 111, 331, all these arrangements allow the saw blades to be visible when stored in the container, in other words, the container can also be used as an exhibition apparatus. Furthermore, the positioning clasp 20 can be easily pivoted to clasp on the cover 30 to make sure the cover 30 is closed firmly with respect to the base 10, which makes the container easy to use. After the clasp 20 is clasped onto the cover 30, the container can be hung from an object by the hanging aperture 211 of the hanging portion 21 of the clasp 20.

While we have shown and described various embodiments in accordance with the present invention, it is clear to those skilled in the art that further embodiments may be made without departing from the scope of the present invention.

What is claimed is:

1. A container for storing multiple saw blades comprising:
a base including a bottom and a peripheral wall around the bottom to define a space;
a cover having one side pivotally fixed to the base, another side clasped to the base by a clasp, and a covering portion between the two sides of the cover, the covering portion being smaller than the base, and a surface of the covering portion toward the base being defined as an inner surface;
a plurality of positioning units each including a stop piece and a central positioning block;
wherein the stop pieces are disposed on the base in a spaced manner, located at different distances from the peripheral wall and each having different heights proportional to the distance from the peripheral wall;
wherein the central positioning blocks are disposed on the base and the cover, the central positioning blocks are each adapted to fit into an opening of a saw blade;
whereby multiple saw blades may be stored in a tier configuration while resting on the stop pieces and held in place by the central positioning blocks.

2. The container for storing multiple saw blades as claimed in claim 1, wherein a connecting portion which includes a mounting seat is formed on an outer surface of the peripheral wall, the cover is provided with an assistant connecting portion which includes an assistant mounting seat, and the assistant mounting seat has an L-shaped hook portion, the clasp includes an engaging portion with an engaging aperture, the clasp has the engaging aperture engaged with the mounting seat of the connecting portion, and has the engaging portion pivotally on the mounting seat, so that the clasp is able to pivot with respect to the connecting portion, when the cover is pivoted to cover the base, the assistant mounting seat is abutted against the mounting seat, and the clasp is selectively clasped to the cover by engaging the engaging aperture with the hook portion, or the clasp is disengaged from the cover.

3. The container for storing multiple saw blades as claimed in claim 1, wherein each of the positioning units further comprises a secondary stop piece, so that when the cover is closed with respect to the base, the stop piece and the secondary stop piece are located at two opposite sides of a central positioning block.

4. The container for storing multiple saw blades as claimed in claim 2, wherein the clasp includes a hanging portion and the engaging portion to define an L-shaped structure, and the hanging portion is formed with a hanging aperture.

5. The container for storing multiple saw blades as claimed in claim 2, wherein the connecting portion further includes two ears formed at two sides of the mounting seat, the clasp is pivotally disposed between the mounting seat and the two ears, the assistant connecting portion further includes two ears formed at two sides of the assistant mounting seat, when the cover is closed with respect to the base, the two ears of the assistant connecting portion are abutted against to the ears of the connecting portion.

6. The container for storing multiple saw blades as claimed in claim 1, wherein a plurality of hollow portions are formed in the bottom of the base.

7. The container for storing multiple saw blades as claimed in claim 1, wherein a plurality of hollow portions are formed in the bottom of the base, in the covering portion is also formed a plurality of hollow portions, and when the cover is closed with respect to the base, the hollow portions of the base are aligned to the hollow portions of the covering portion.

8. The container for storing multiple saw blades as claimed in claim 1, wherein the cover is made of transparent plastic material.

9. The container for storing multiple saw blades as claimed in claim 1, wherein the covering portion is mushroom-shaped.

10. The container for storing multiple saw blades as claimed in claim 1, wherein the number of the positioning units is three, and the three positioning units are a first positioning unit, a second positioning unit, and a third positioning unit, the first positioning unit includes a first stop piece, a first secondary stop piece and a first central positioning block, the second positioning unit includes a second stop piece, a second secondary stop piece and a second central positioning block, the third positioning unit includes a third stop piece, a third secondary stop piece and a third central positioning block, the first central positioning block is a cylindrical member disposed on the bottom of the base, the first, second and third stop pieces are disposed on the bottom of the base in a spaced manner and located at a same side of the first central positioning block, the first secondary stop piece is disposed on the bottom of the base, the second and third secondary stop pieces are disposed on the inner surface of the covering portion of the cover, and the second and third central positioning blocks are disposed on the inner surface of the covering portion of the cover in a superimposed manner.

* * * * *